US012400083B2

(12) United States Patent
Salama et al.

(10) Patent No.: US 12,400,083 B2
(45) Date of Patent: Aug. 26, 2025

(54) TRANSCRIPTION ERROR RESILIENT TRAINING OF NEURAL SEMANTIC PARSERS

(71) Applicant: Google LLC, Mountain View, CA (US)

(72) Inventors: Khalid Salama, London (GB); Ágoston Weisz, Pfaeffikon (CH)

(73) Assignee: Google LLC, Mountain View, CA (US)

( * ) Notice: Subject to any disclaimer, the term of this patent is extended or adjusted under 35 U.S.C. 154(b) by 273 days.

(21) Appl. No.: 18/338,338

(22) Filed: Jun. 20, 2023

(65) Prior Publication Data

US 2024/0427997 A1 Dec. 26, 2024

(51) Int. Cl.
*G10L 15/16* (2006.01)
*G06F 40/30* (2020.01)
(Continued)

(52) U.S. Cl.
CPC ............. *G06F 40/30* (2020.01); *G06F 40/40* (2020.01); *G06F 40/44* (2020.01); *G10L 15/16* (2013.01); *G10L 15/063* (2013.01); *G10L 15/18* (2013.01)

(58) Field of Classification Search
CPC .......... G06F 40/30; G06F 40/44; G06F 40/45; G06F 40/279; G06F 16/3329;
(Continued)

(56) References Cited

U.S. PATENT DOCUMENTS 11,929,060 B2 * 3/2024 Chen ....................... G10L 13/02
12,136,418 B2 * 11/2024 Pust ..................... G10L 15/1815
(Continued)

OTHER PUBLICATIONS

Yingying Gao et al, "Meta Auxiliary Learning for Low-resource Spoken Language Understanding", arxiv.org, Cornell University Library, 201 Olin Library Cornell University Ithaca, NY 14853,Jun. 26, 2022 (Jun. 26, 2022), XP091257519.
(Continued)

*Primary Examiner* — Vijay B Chawan
(74) *Attorney, Agent, or Firm* — Honigman LLP; Brett A. Krueger; Grant Griffith (57) ABSTRACT

A method includes obtaining a set of training queries that each specify a corresponding operation to perform and include a corresponding plurality of speech recognition hypotheses that each represent a corresponding candidate transcription of the training query, and a corresponding ground-truth transcription of the training query. For each training query, the method includes processing, using an encoder of a neural semantic parsing (NSP) model, the corresponding plurality of speech recognition hypotheses to generate a corresponding NSP embedding, processing, using a transcription decoder, the corresponding NSP embedding to generate a corresponding predicted transcription, and determining a corresponding first loss based on the corresponding predicted transcription and the corresponding ground-truth transcription. The method further includes training, based on the first losses determined for the set of training queries, the NSP model to learn how to predict user intents associated with the operations specified by the training queries.

22 Claims, 4 Drawing Sheets

(51) Int. Cl.
  *G06F 40/40* (2020.01)
  *G06F 40/44* (2020.01)
  *G10L 15/06* (2013.01)
  *G10L 15/18* (2013.01)

(58) Field of Classification Search
  CPC .... G06F 40/166; G06F 40/211; G06F 40/216; G06F 40/284; G06F 40/295; G06F 40/40; G06N 3/045; G06N 3/08; G06N 3/047; G06N 3/044; G10L 15/16; G10L 15/22; G10L 15/18; G10L 15/1815; G10L 15/063; G10L 15/197; G10L 15/26; G10L 15/1822; G10L 2015/0635; G10L 15/02; G10L 2015/025; G10L 17/18; G10L 17/04; G10L 15/183
  USPC .............................................. 704/9, 257, 232
  See application file for complete search history.

(56) References Cited

U.S. PATENT DOCUMENTS

| | | | | |
|---|---|---|---|---|
| 2020/0349922 | A1* | 11/2020 | Peyser | G10L 15/063 |
| 2022/0005465 | A1* | 1/2022 | Prabhavalkar | G06N 3/045 |
| 2023/0103382 | A1* | 4/2023 | Lu | G10L 15/16 |
| | | | | 704/232 |
| 2023/0237995 | A1* | 7/2023 | Prabhavalkar | G10L 15/02 |
| | | | | 704/232 |
| 2023/0320642 | A1* | 10/2023 | Lin | G06F 40/30 |
| 2023/0335125 | A1* | 10/2023 | Velikovich | G10L 15/197 |
| 2023/0377564 | A1* | 11/2023 | Peyser | G10L 15/16 |
| 2024/0021190 | A1* | 1/2024 | Biadsy | G10L 15/063 |
| 2024/0194188 | A1* | 6/2024 | Weisz | G10L 15/22 |
| 2024/0257799 | A1* | 8/2024 | Zivkovic | G10L 15/08 |
| 2024/0427997 | A1* | 12/2024 | Salama | G06F 40/40 |
| 2025/0053751 | A1* | 2/2025 | Akerlund | G06F 40/40 |
| 2025/0139379 | A1* | 5/2025 | Jain | G06F 16/483 |

OTHER PUBLICATIONS

Duc Le et al, "Deliberation Model for On-Device Spoken Language Understanding", arxiv.org, Cornell University Library, 201 Olin Library Cornell University Ithaca, NY 14853,Apr. 4, 2022 (Apr. 4, 2022), XP091199792.

Chen Yixin et al, "Top-Down Attention in End-to-End Spoken Language Understanding", ICASSP 2021—2021 IEEE International Conference on Acoustics, Speech and Signal Processing (ICASSP), IEEE,Jun. 6, 2021 (Jun. 6, 2021), p. 6199-6203, XP033954936.

International Search Report and Written Opinion issued in related PCT Application No. PCT/US2024/034318, dated Sep. 18, 2024.

* cited by examiner

TRANSCRIPTION ERROR RESILIENT TRAINING OF NEURAL SEMANTIC PARSERS

TECHNICAL FIELD

This disclosure relates to neural semantic parsers and, more particularly, to transcription error resilient training of neural semantic parsers.

BACKGROUND

Automatic speech recognition (ASR) is an important technology that is increasingly used in mobile devices and other devices. Neural semantic parser (NSP) models are also increasingly used to process a transcription of what a person has said to determine an intent of the person. For example, an NSP model may be used to determine that a person intends to create an alarm, play a song, or send a message.

SUMMARY

One aspect of the disclosure provides a computer-implemented executed on data processing hardware that causes the data processing hardware to perform operations that include obtaining a set of training queries, each training query in the set of training queries specifying a corresponding operation to perform and including: a corresponding plurality of speech recognition hypotheses, each speech recognition hypothesis representing a corresponding candidate transcription of the training query and generated by a speech recognizer from audio data characterizing the training query; and a corresponding ground-truth transcription of the training query. For each training query in the set of training queries: the operations also include processing, using a neural semantic parsing (NSP) encoder of an NSP model, the corresponding plurality of speech recognition hypotheses to generate a corresponding NSP embedding; processing, using a transcription decoder, the corresponding NSP embedding to generate a corresponding predicted transcription of the training query; and determining a corresponding first loss based on the corresponding predicted transcription of the training query and the corresponding ground-truth transcription of the training query. The operations further include training, based on the first losses determined for the set of training queries, the NSP model to learn how to predict user intents associated with the operations specified by the training queries.

Implementations of the disclosure may include one or more of the following optional features. In some examples, the operations further include the corresponding plurality of speech recognition hypotheses includes: a top speech recognition hypothesis associated with the speech recognition hypothesis having a highest respective speech recognition confidence score among the corresponding plurality of speech recognition hypotheses generated by the speech recognizer; and one or more alternative speech recognition hypotheses each having a respective speech recognition confidence score that is lower than the respective speech recognition confidence score of the top speech recognition hypothesis.

In some implementations, each training query in the set of training queries also includes a corresponding ground-truth user intent associated with the corresponding operation specified by the training query; and the operations also include, for each training query in the set of training queries: processing, using an NSP decoder of the NSP model, the corresponding NSP embedding to generate a corresponding predicted user intent for the training query; and determining a corresponding second loss based on the corresponding predicted user intent and the corresponding ground-truth user intent associated with the corresponding operation specified by the training query; and training the NSP model also includes training the NSP model based on the second losses determined for the set of training queries. Training the NSP model may include weighting the first losses with a first weight, and weighting the second losses with a second weight different from the first weight. Training the NSP model may include updating first coefficients of the NSP encoder, and updating second coefficients of the NSP decoder.

In some examples, the operations also include training the transcription decoder based on the first losses. In some implementations, the operations also include, for each training query in the set of training queries, obtaining corresponding contextual information associated with the training query, and generating the corresponding NSP embedding using the NSP encoder by also processing, using the NSP encoder, the corresponding contextual information associated with the training query. The corresponding contextual information may include at least one of user device information for the training query, location information associated with the training query, time information associated with the training query, user information associated with the training query, or a previous query submitted during a dialog prior to the training query.

In some implementations, the transcription decoder is not constrained to generate the corresponding predicted transcription for the training query as one of the corresponding plurality of speech recognition hypotheses. In some examples, the transcription decoder is not executed during an inference operation of the NSP model. In some implementations, the operations further include, for at least one training query in the set of training queries, generating, using a teacher model, the corresponding ground-truth transcription from the audio data characterizing the training query.

Another aspect of the disclosure provides a system that includes data processing hardware and memory hardware in communication with the data processing hardware. The memory hardware stores instructions that, when executed on the data processing hardware, causes the date processing hardware to perform operations that include obtaining a set of training queries, each training query in the set of training queries specifying a corresponding operation to perform and including: a corresponding plurality of speech recognition hypotheses, each speech recognition hypothesis representing a corresponding candidate transcription of the training query and generated by a speech recognizer from audio data characterizing the training query; and a corresponding ground-truth transcription of the training query. For each training query in the set of training queries: the operations also include processing, using a neural semantic parsing (NSP) encoder of an NSP model, the corresponding plurality of speech recognition hypotheses to generate a corresponding NSP embedding; processing, using a transcription decoder, the corresponding NSP embedding to generate a corresponding predicted transcription of the training query; and determining a corresponding first loss based on the corresponding predicted transcription of the training query and the corresponding ground-truth transcription of the training query. The operations further include training, based on the first losses determined for the set of training queries, the NSP model to learn how to predict user intents associated with the operations specified by the training queries.

Implementations of the disclosure may include one or more of the following optional features. In some examples, the operations further include the corresponding plurality of speech recognition hypotheses includes: a top speech recognition hypothesis associated with the speech recognition hypothesis having a highest respective speech recognition confidence score among the corresponding plurality of speech recognition hypotheses generated by the speech recognizer; and one or more alternative speech recognition hypotheses each having a respective speech recognition confidence score that is lower than the respective speech recognition confidence score of the top speech recognition hypothesis.

In some implementations, each training query in the set of training queries also includes a corresponding ground-truth user intent associated with the corresponding operation specified by the training query; and the operations also include, for each training query in the set of training queries: processing, using an NSP decoder of the NSP model, the corresponding NSP embedding to generate a corresponding predicted user intent for the training query; and determining a corresponding second loss based on the corresponding predicted user intent and the corresponding ground-truth user intent associated with the corresponding operation specified by the training query; and training the NSP model also includes training the NSP model based on the second losses determined for the set of training queries. Training the NSP model may include weighting the first losses with a first weight, and weighting the second losses with a second weight different from the first weight. Training the NSP model may include updating first coefficients of the NSP encoder, and updating second coefficients of the NSP decoder.

In some examples, the operations also include training the transcription decoder based on the first losses. In some implementations, the operations also include, for each training query in the set of training queries, obtaining corresponding contextual information associated with the training query, and generating the corresponding NSP embedding using the NSP encoder by also processing, using the NSP encoder, the corresponding contextual information associated with the training query. The corresponding contextual information may include at least one of user device information for the training query, location information associated with the training query, time information associated with the training query, user information associated with the training query, or a previous query submitted during a dialog prior to the training query.

In some implementations, the transcription decoder is not constrained to generate the corresponding predicted transcription for the training query as one of the corresponding plurality of speech recognition hypotheses. In some examples, the transcription decoder is not executed during an inference operation of the NSP model. In some implementations, the operations further include, for at least one training query in the set of training queries, generating, using a teacher model, the corresponding ground-truth transcription from the audio data characterizing the training query.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Automatic speech recognition (ASR) is an important technology that is increasingly used in mobile devices and other devices. Neural semantic parser (NSP) in models are also increasingly used to perform semantic analysis on a transcription of what a person has said to determine an intent of the person. For example, an NSP model may be used to determine that a person intends to create an alarm, play a song, or send a message. Typical NSP models include an NSP input encoder (also referred to herein as an NSP encoder or simply "encoder") and an NSP interpretation decoder (also referred to herein as an NSP decoder). In general, ASR systems generate accurate transcriptions of what a person has said and NSP models perform semantic analysis on these transcriptions to identify the person's intent, such as an operation specified by the person for a downstream application to perform. However, for a variety of reasons, a generated transcription of what a person has said may have one or more speech recognition errors. When a transcription includes a speech recognition error, the error may propagate down to the NSP model when subsequently processing the transcription such that the NSP model predicts an error-prone user intent. In some circumstances, the NSP model is unable to generate a predicted user intent for a transcription that includes a speech recognition error. Accordingly, there is a need for NSP models that are more resilient to speech recognition errors.

Implementations herein are directed toward systems and methods that train NSP models to be more resilient to transcription errors so that the NSP models are capable of predicting accurate user intents despite errors that may be present in input transcriptions. In some implementations, an NSP model is trained on both a transcription prediction task and a user intent prediction task. Here, the NSP encoder encodes a predicted transcription of a training query (e.g., generated by an automatic speech recognition (ASR) system) and, in some instances, one or more additional speech recognition hypotheses for the training query (e.g., generated by the ASR system) to generate an NSP embedding. Notably, any or all of the predicted transcription and the one or more additional speech recognition hypotheses may include a speech recognition error. An NSP decoder of the NSP model then processes the NSP embedding to generate a predicted user intent for the training query. A transcription decoder also processes the NSP embedding to generate another predicted transcription of the training query. The NSP model may then be trained (e.g., one or more of this coefficients of the NSP model updated) based on a first error between the predicted transcription generated by the transcription decoder and a ground-truth transcription of the training query. Here, updating the NSP model based on the first error may train the NSP encoder to implement a denoising autoencoder that attempts to generate, based on the transcription predicted by an ASR system and the one or more additional speech recognition hypotheses, the same NSP embedding as would be generated if the NSP encoder encoded the ground-truth transcription of the training query. The NSP model may also be trained (e.g., one or more of this coefficients of the NSP model updated) based on a second error between the predicted user intent and a ground-truth user intent for the training query.

Figure 1:
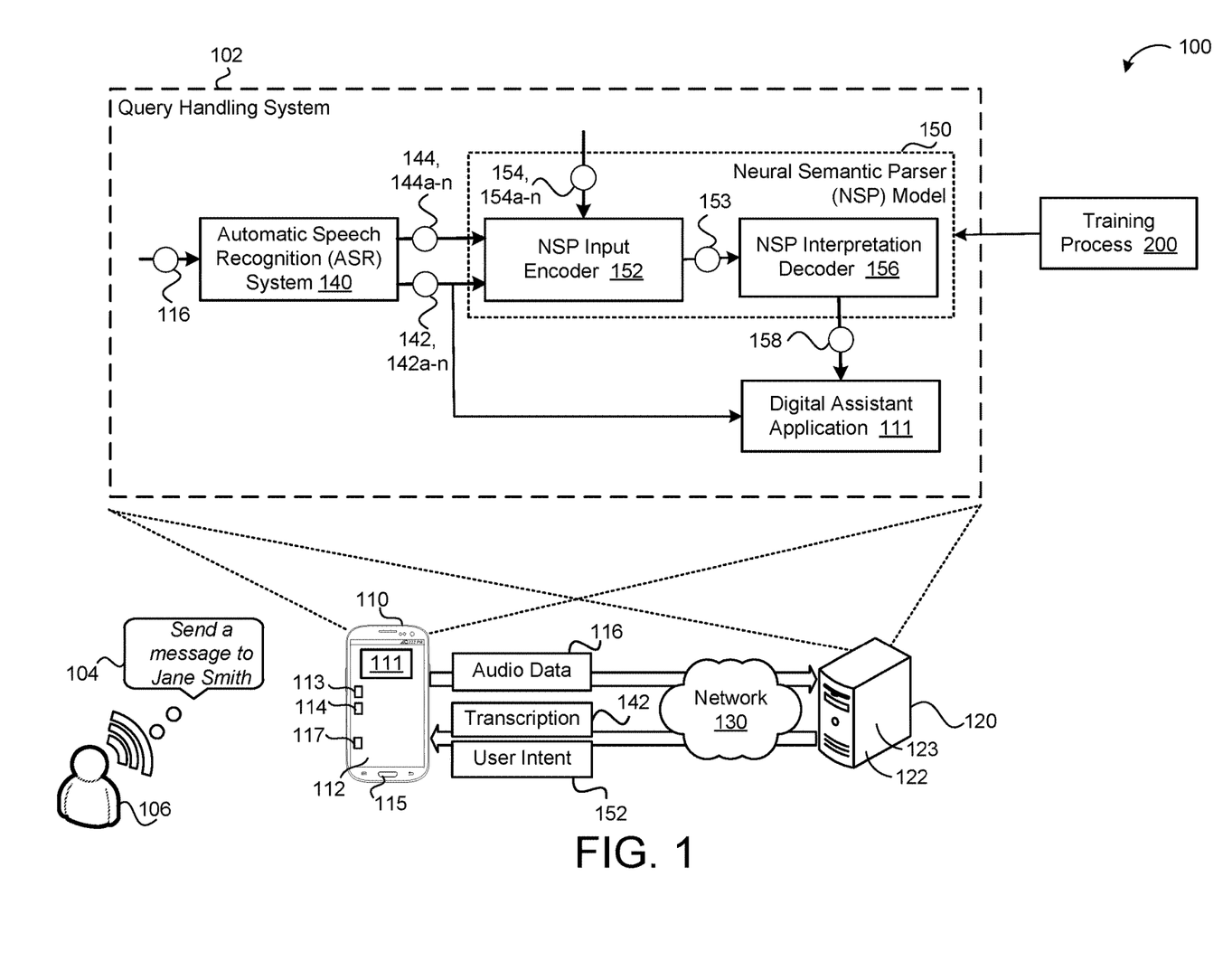
FIG. 1 is a schematic view of an example system including an example query handling system.

FIG. 1 illustrates an example of a system 100 including a query handling system 102 for handling a query 104 spoken by a user 106 of a user device 110. Alternatively, the query 104 may be a text-, image-, or video-based input. Handling the query 104 includes, but is not limited to providing a response that is responsive to the query 104 and/or performing an action specified by the query that corresponds to a predicted user intent for the query 104. Here, a digital assistant application 111 may cause the response to be audibly output by the user device 110, may cause a textual-, image- or video-based representation of the response to be graphically output on a display 112 of the user device 110, and/or may perform an action corresponding to the predicted user intent for the query 104. Example user intents include, but are not limited to, creating an alarm, setting a time, playing a particular piece of media content, send a message, and initiating a phone call.

The system 100 includes the user device 110, a remote computing system 120, and a network 130. The user device 110 includes data processing hardware 113 and memory hardware 114. The user device 110 may include, or be in communication with, one or more audio capture devices 115 (e.g., an array of one or more microphones) for capturing and converting queries 104 spoken by the user 106 into audio data 116 (e.g., electrical signals or digital data). The user device 110 may also include, or be in communication with, one or more audio output devices 117 (e.g., an array of one or more speakers) for converting audio data (e.g., electrical signals or digital data) into audible signals emitted by the user device 110. The user device 110 may be any computing device capable of communicating with the remote computing system 120 through the network 130. The user device 110 includes, but is not limited to, desktop computing devices and mobile computing devices, such as laptops, tablets, smart phones, smart speakers/displays, digital assistant devices, smart appliances, internet-of-things (IoT) devices, infotainment systems, vehicle infotainment systems, and wearable computing devices (e.g., headsets, smart glasses, and/or watches).

The remote computing system 120 may be a distributed system (e.g., a cloud computing environment) having scalable elastic resources. The resources include computing resources 122 (e.g., data processing hardware) and/or storage resources 123 (e.g., memory hardware). Additionally or alternatively, the remote computing system 120 may be a centralized system. The network 130 may be wired, wireless, or a combination thereof, and may include private networks and/or public networks, such as the Internet.

In the example shown, the user 106 speaks a query 104, and the user device 110 receives audio data 116 characterizing the query 104 captured by the audio capture device(s) 115 of the user device 110. Here, the query 104 may specify an operation that the user intends for the device 110, digital assistant 111, or some other downstream application to perform. In the example shown, the query 104 includes the user 106 speaking "Send a message to Jane Smith" to direct the digital assistant 111 executing on the user device 110 to initiate sending a message to Jane Smith.

In the example shown, an ASR system 140 of the query handling system 102 processes the audio data 116 to generate one or more speech recognition hypotheses 142, 142a-n for the query 104. Here, each speech recognition hypothesis 142 represents a candidate transcription for the query 104. In some examples, the ASR system 140 also outputs speech recognition confidence scores 144, 144a-n for respective ones of the speech recognition hypotheses 142. Here, ASR system 140 generates, as a predicted transcription of the query 104, the top speech recognition hypothesis 142 of the speech recognition hypotheses 142 that has the highest respective speech recognition confidence score 144, while other speech recognition hypotheses 142 represent alternative transcriptions of the query 104 having lower speech recognition confidence scores 144. The ASR system 140 may implement any number and/or type(s) of past, current, or future speech recognition systems, models and/or methods including, but not limited to, an end-to-end speech recognition model, such as streaming speech recognition models having recurrent neural network-transducer (RNN-T) model architectures, a hidden Markov model, an acoustic model, a pronunciation model, a language model, and/or a naïve Bayes classifier.

An NSP encoder 152 of the NSP model 150 processes one or more of the one or more speech recognition hypotheses 142 to generate an NSP embedding 153 for the query 104. Here, the NSP encoder 152 may process all of the one or more speech recognition hypotheses 142, may process a top N of the one or more speech recognition hypotheses 142 having the highest speech recognition confidence scores 144, may process a set of the one or more speech recognition hypotheses 142 having respective speech recognition confidence scores 144 that satisfy a threshold, or may process only the top speech recognition hypothesis 142 of the one or more speech recognition hypotheses 142 having the highest speech recognition confidence score 144 and that represents a predicted transcription of the query 104 generated by the ASR system 140. The NSP encoder 152 may, when generating the NSP embedding 153, also process context information 154, 154a-n associated with the query 104. Example context information 154 includes, but is not limited to, user device information 154a for the user device 110, location information 154b associated with the query 104, time information 154c associated with the query 104, user information 154d associated with the user 106, and one or more queries 154e submitted during one or more dialogs prior to the query 104. Still further, the NSP encoder 152 may, when generating the NSP embedding 153, also process the speech recognition confidences scores 144. The NSP encoder 152 may implement any number and/or type(s) of past, current, or future NSP encoders including, but not limited to, a transformer encoder, a multi-headed attention mechanism, and an autoregressive transformer.

An NSP decoder 156 of the NSP model 150 processes the NSP embedding 153 to generate a predicted user intent 158 for the query 104. Here, the predicted user intent 158 indicates to the digital assistant application 111 how the digital assistant application 111 is to respond or what action the digital assistant application 111 is to perform. The NSP decoder 156 may implement any number and/or type(s) of past, current, or future NSP decoders.

As described herein, the user device 110 implements the digital assistant application 111, the ASR system 140, and the NSP model 150. However, it is understood that the remote computing system 120 may implement one or more of the digital assistant application 111, the ASR system 140, and/or the NSP model 150, in addition to, or instead of, the user device 110 performing the digital assistant application 111, the ASR system 140, and/or the NSP model 150.

The system 100 includes a training process 200 (see FIG. 2) for training the NSP model 150 on both a user intent prediction task and a transcription prediction task. In some implementations, the training process 200 trains the NSP model 150 on both tasks at the same time. When the training process 200 trains the NSP model 150 on both tasks at the same time, it may weight losses associated with the user intent prediction task with a first weight, and weight losses associated with the transcription prediction task with a second weight different from the first weight. Here, the training process 200 may train the NSP model 150 by updating coefficients of one or both of the NSP encoder 152 and the NSP decoder 156. The training process 200 may reside on the user device 110 and/or on the remote computing system 120.

Figure 2:
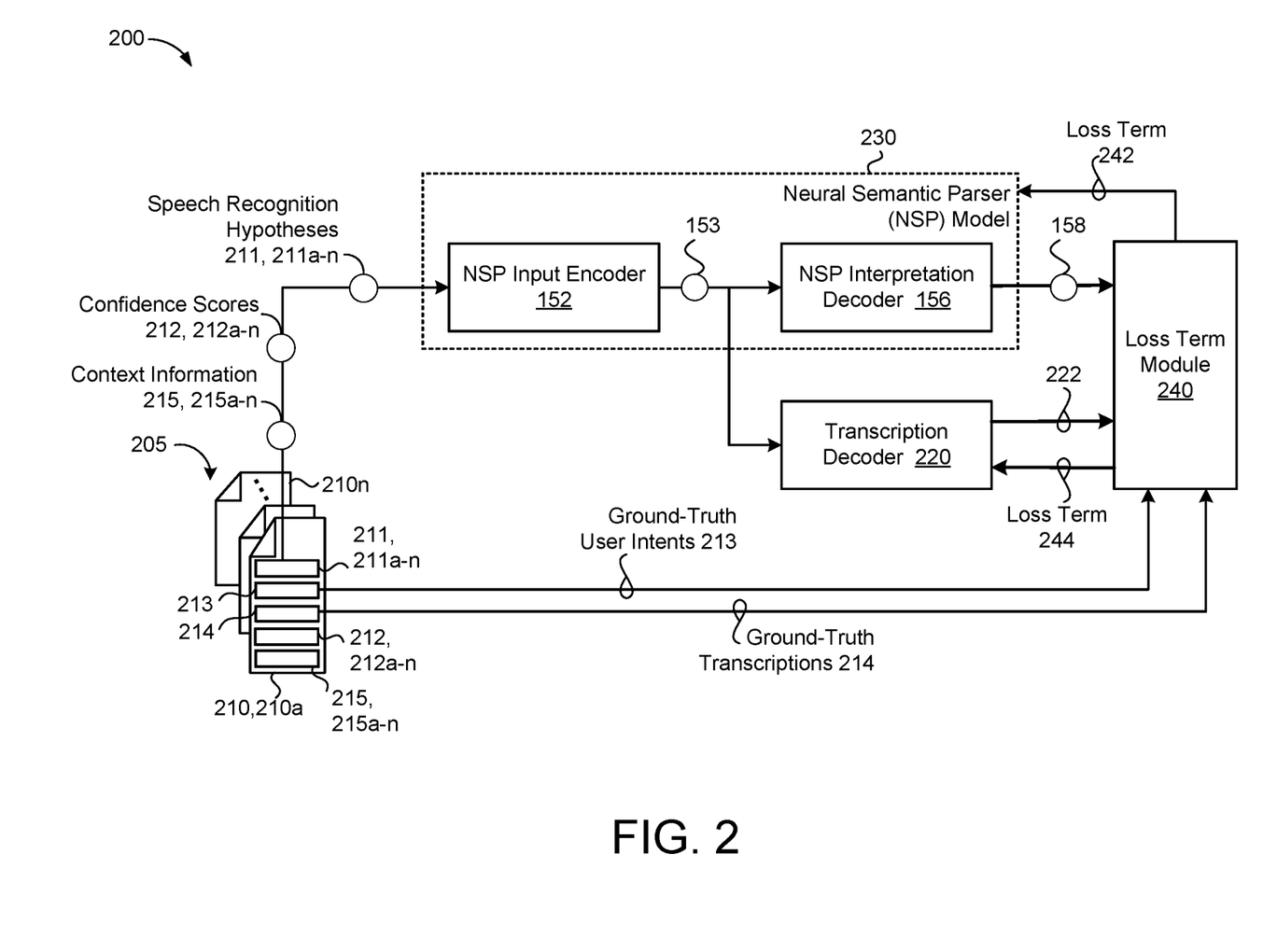
FIG. 2 is a schematic view of an example training process for training a neural semantic parsing (NSP) model to be resilient to transcription errors.

FIG. 2 is a schematic view of an example of a training process 200 for training an NSP model 230 to be more resilient to transcription errors (i.e., speech recognition errors). As shown, the NSP model 230 may include the NSP model 150 of FIG. 1 that includes the NSP encoder 152 and the NSP decoder 156. The training process 200 may execute on the remote computing system 120 (i.e., on the data process hardware 122) and/or on the user device 110 (i.e., on the data processing hardware 113).

The training process 200 trains the NSP model 150 based on training data 205 that includes a set of training queries 210, 210a-n. Here, each training query 210 in the set of training queries 210 specifies a corresponding operation to perform and includes: (i) a corresponding plurality of speech recognition hypotheses 211, 211a-n, where each speech recognition hypothesis 211 represents a corresponding candidate transcription of the training query 210 and is generated by a speech recognizer from audio data characterizing the training query 210; (ii) a corresponding ground-truth user intent 213 associated with the corresponding operation specified by the training query 210; and (iii) a corresponding ground-truth transcription 214 of the training query 210. As shown, each training query 210 may also include corresponding speech recognition confidence scores 212, 212a-n for respective ones of the speech recognition hypotheses 211, and/or corresponding context information 215, 215a-n. In some implementations, the corresponding ground-truth transcription 214 of a training query 210 is generated by processing, using a teacher model, audio data characterizing the training query 210.

The training process 200 trains the NSP model 230 on a user intent prediction task by processing training queries 210 with the NSP model 230 to generate predicted user intents 158, and updating coefficients of the NSP model 230 based on errors between the predicted user intents 158 and corresponding ground-truth user intents 213. The training process 200 also trains the NSP model 230 on a transcription prediction task by processing training queries 210 with the NSP encoder 152 and a transcription decoder 220 to generate predicted transcriptions 222, and updating coefficients of the NSP model 230 based on errors between the predicted transcriptions 222 and corresponding ground-truth transcriptions 214. In some implementations, the training process 200 also trains the transcription decoder 220 based on errors between the predicted user intents 158 and corresponding ground-truth user intents 213 and/or based on errors between the predicted transcriptions 222 and corresponding ground-truth transcriptions 214. In some examples, the training process 200 trains the NSP model 230 for each training query. In other examples, the training process 200 trains the NSP model 230 by aggregating errors for a plurality of training errors before updating coefficients of the NSP model 150 based on aggregated errors.

More specifically, for each training query 210 in the set of trainings queries 210, the training process 200 processes, using the NSP encoder 152, a corresponding plurality of speech recognition hypotheses 211 and, in some examples, corresponding speech recognition confidence scores 212 and/or corresponding context information 215, to generate a corresponding NSP embedding 153 for the training query 210. The training process 200 processes, using the transcription decoder 220, the corresponding NSP embedding 153 to generate a corresponding predicted transcription 222 of the training query 210. Notably, the transcription decoder 220 is not constrained to generate the corresponding predicted transcription 222 for the training query 210 as one of the corresponding plurality of speech recognition hypotheses 211. Thereafter, a loss term module 240 determines a first error between the corresponding predicted transcription 222 generated by the transcription decoder 220 and the corresponding ground-truth transcription 214 of the training query 210. Here, the first error may be based a number of word errors. As shown in FIG. 1, the transcription decoder 220 may not be executed during an inference operation performed by the NSP model 150, 230.

The training process 200 also processes the corresponding NSP embedding 153, using the NSP decoder 156, to generate a corresponding predicted user intent 158 for the training query 210. Thereafter, the loss term module 240 determines a second error between the corresponding predicted user intent 158 generated by the NSP decoder 156 and the corresponding ground-truth user intent 213 for the training query 210.

The training process 200 trains the NSP model 230 (e.g., updates one or more coefficients of the NSP encoder 152 and/or the NSP decoder 156) based on a loss term 242 determined based on (i) a first loss that is based on the first error between the corresponding predicted transcription 222 generated by the transcription decoder 220 and the corresponding ground-truth transcription 214 of the training query 210, and/or (ii) a second loss that is based on the second error between the corresponding predicted user intent 158 generated by the NSP decoder 156 and the corresponding ground-truth user intent 213 for the training query 210. Here, the training process 200 may, while determining the loss term 242, weight the first error or first loss with a first weight, and weight the second error or second loss with a second weight different from the first weight. In some examples, the first loss is determined to reduce a word error rate.

In some implementations, the training process 200 also trains the transcription decoder 220 based on a loss term 244 determined based on (i) a third loss that is based on the first error between the corresponding predicted transcription 222 generated by the transcription decoder 220 and the corresponding ground-truth transcription 214 of the training query 210, and/or (ii) a fourth loss that is based on the second error between the corresponding predicted user intent 158 generated by the NSP decoder 156 and the corresponding ground-truth user intent 213 for the training query 210. Here, the training process 200 may, while determining the loss term 244, weight the first error or third loss with a third weight, and weight the second error or fourth loss with a fourth weight different from the third weight. The third loss may be different from the first loss used to update the NSP model 230, and the fourth loss may be different from the second loss used to update the NSP model 230.

Figure 3:
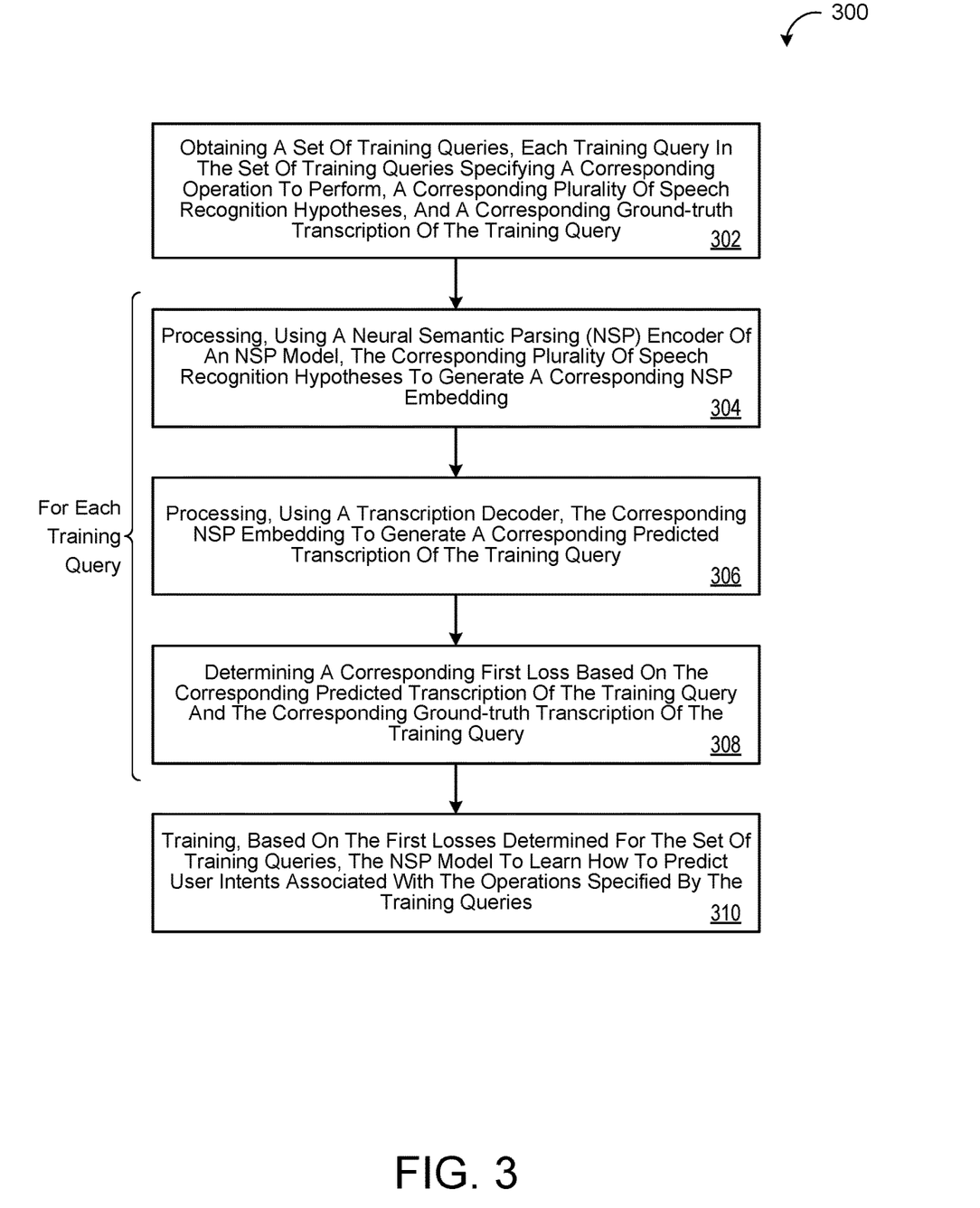
FIG. 3 is a flowchart of an exemplary arrangement of operations for a method of training an NSP model to be resilient to transcription errors.

FIG. 3 is a flowchart of an exemplary arrangement of operations for a method 300 of training an NSP model to be resilient to transcription errors. The operations may execute on data processing hardware 410 (FIG. 4) by executing instructions stored on memory hardware 420 in communication with the data processing hardware 420. The data processing hardware 410 may include the data processing hardware 113 (FIG. 1) of the user device 110 and/or the data processing hardware 122 (FIG. 1) of the remote computing system 120. The memory hardware 420 may include the data memory hardware 114 (FIG. 1) of the user device 110 and/or the memory hardware 123 of the remote computing system 120.

At operation 302, the method 300 includes obtaining a set of training queries 210. Each training query 210 in the set of training queries 210 specifying a corresponding operation to perform and including a corresponding plurality of speech recognition hypotheses 211, each speech recognition hypothesis 211 representing a corresponding candidate transcription of the training query 210 and generated by a speech recognizer from audio data characterizing the training query 210, and a corresponding ground-truth transcription 214 of the training query 210.

For each training query 210 in the set of training queries 210, the method 300 includes, at operation 304, processing, using an NSP encoder 152 of an NSP model 150, the corresponding plurality of speech recognition hypotheses 211 to generate a corresponding NSP embedding 153, at operation 306, processing, using a transcription decoder 220, the corresponding NSP embedding 153 to generate a corresponding predicted transcription 222 of the training query 210 and, at operation 308, determining a corresponding first loss based on the corresponding predicted transcription 222 of the training query and the corresponding ground-truth transcription 214 of the training query 210.

At operation 310, the method 300 includes training, based on the first losses determined for the set of training queries 210, the NSP model 150 to learn how to predict user intents associated with the operations specified by the training queries 210.

Figure 4:
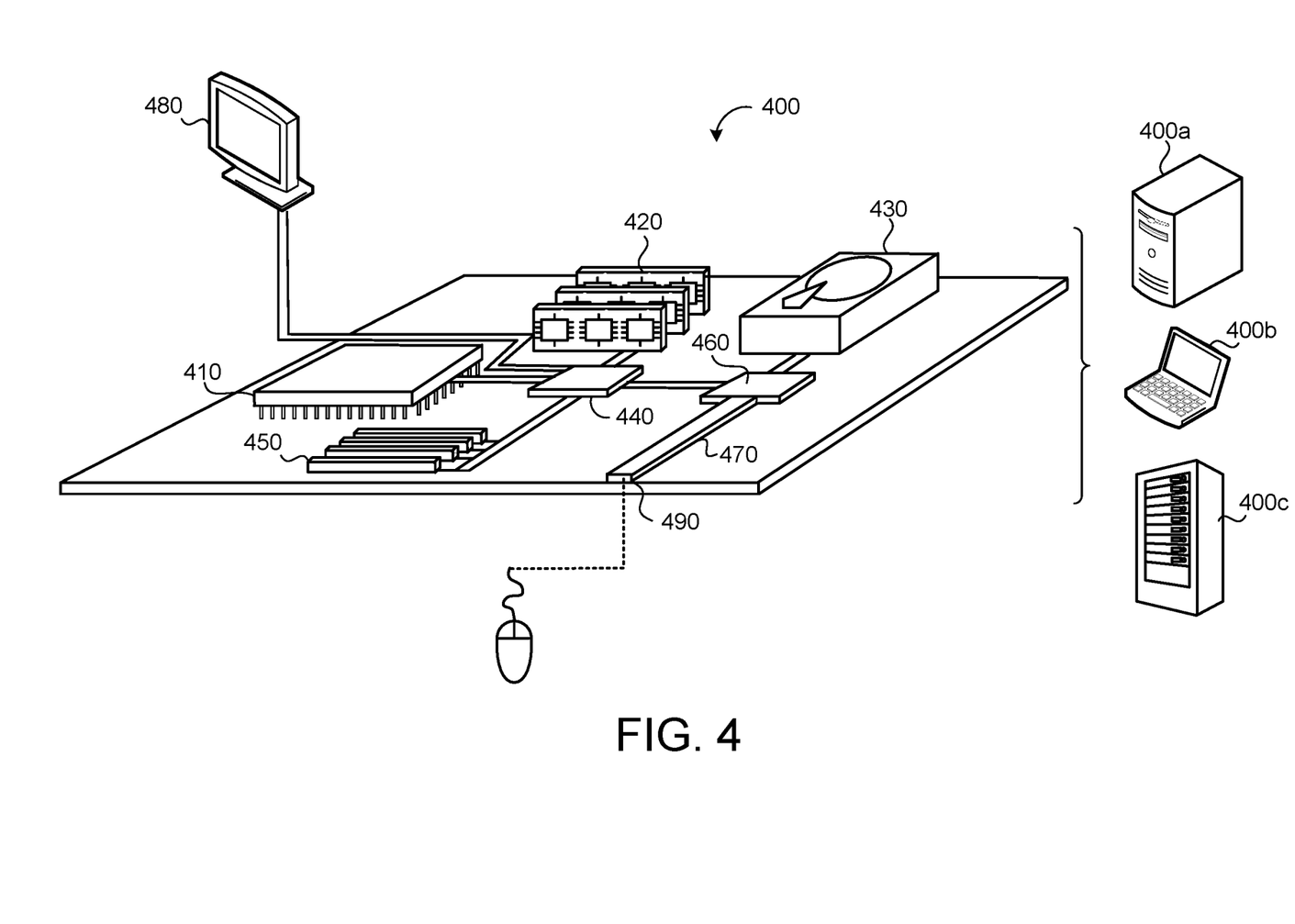
FIG. 4 is a schematic view of an example computing device that may be used to implement the systems and methods described herein.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document. The computing device 400 includes a processor 410 (i.e., data processing hardware) that can be used to implement the data processing hardware 113 and/or 122, memory 420 (i.e., memory hardware) that can be used to implement the memory hardware 114 and/or 123, a storage device 430 (i.e., memory hardware) that can be used to implement the memory hardware 114 and/or 123, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, the phrase "at least one of A, B, or C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least C; and (7) at least one A with at least one B and at least one C. Moreover, unless expressly stated to the contrary, the phrase "at least one of A, B, and C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least one C; and (7) at least one A with at least one B and at least one C. Furthermore, unless expressly stated to the contrary, "A or B" is intended to refer to any combination of A and B, such as: (1) A alone; (2) B alone; and (3) A and B.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:
obtaining a set of training queries, each training query in the set of training queries specifying a corresponding operation to perform and comprising:
a corresponding plurality of speech recognition hypotheses, each speech recognition hypothesis representing a corresponding candidate transcription of the training query and generated by a speech recognizer from audio data characterizing the training query; and
a corresponding ground-truth transcription of the training query;
for each training query in the set of training queries:
processing, using an encoder of a neural semantic parsing (NSP) model, the corresponding plurality of speech recognition hypotheses to generate a corresponding NSP embedding;
processing, using a transcription decoder, the corresponding NSP embedding to generate a corresponding predicted transcription of the training query; and
determining a corresponding first loss based on the corresponding predicted transcription of the training query and the corresponding ground-truth transcription of the training query; and
training, based on the first losses determined for the set of training queries, the NSP model to learn how to predict user intents associated with the operations specified by the training queries.

2. The computer-implemented method of claim 1, wherein the corresponding plurality of speech recognition hypotheses comprises:
   a top speech recognition hypothesis associated with the speech recognition hypothesis having a highest respective speech recognition confidence score among the corresponding plurality of speech recognition hypotheses generated by the speech recognizer; and
   one or more alternative speech recognition hypotheses each having a respective speech recognition confidence score that is lower than the respective speech recognition confidence score of the top speech recognition hypothesis.

3. The computer-implemented method of claim 1, wherein:
   each training query in the set of training queries further comprises a corresponding ground-truth user intent associated with the corresponding operation specified by the training query; and
   the operations further comprise, for each training query in the set of training queries:
      processing, using an NSP decoder of the NSP model, the corresponding NSP embedding to generate a corresponding predicted user intent for the training query; and
      determining a corresponding second loss based on the corresponding predicted user intent and the corresponding ground-truth user intent associated with the corresponding operation specified by the training query; and
   training the NSP model further comprises training the NSP model based on the second losses determined for the set of training queries.

4. The computer-implemented method of claim 3, wherein training the NSP model comprises:
   weighting the first losses with a first weight; and
   weighting the second losses with a second weight different from the first weight.

5. The computer-implemented method of claim 3, wherein training the NSP model comprises:
   updating first coefficients of the encoder; and
   updating second coefficients of the NSP decoder.

6. The computer-implemented method of claim 1, wherein the operations further comprise training the transcription decoder based on the first losses.

7. The computer-implemented method of claim 1, wherein the operations further comprise, for each training query in the set of training queries:
   obtaining corresponding contextual information associated with the training query; and
   generating the corresponding NSP embedding using the encoder by also processing, using the encoder, the corresponding contextual information associated with the training query.

8. The computer-implemented method of claim 7, wherein the corresponding contextual information comprises at least one of:
   user device information for the training query;
   location information associated with the training query;
   time information associated with the training query;
   user information associated with the training query; or
   a previous query submitted during a dialog prior to the training query.

9. The computer-implemented method of claim 1, wherein the transcription decoder is not constrained to generate the corresponding predicted transcription for the training query as one of the corresponding plurality of speech recognition hypotheses.

10. The computer-implemented method of claim 1, wherein the transcription decoder is not executed during an inference operation of the NSP model.

11. The computer-implemented method of claim 1, wherein the operations further comprise, for at least one training query in the set of training queries, generating, using a teacher model, the corresponding ground-truth transcription from the audio data characterizing the training query.

12. A system comprising:
data processing hardware; and
memory hardware in communication with the data processing hardware and storing instructions that, when executed on the data processing hardware, causes the data processing hardware to perform operations comprising:
   obtaining a set of training queries, each training query in the set of training queries specifying a corresponding operation to perform and comprising:
      a corresponding plurality of speech recognition hypotheses, each speech recognition hypothesis representing a corresponding candidate transcription of the training query and generated by a speech recognizer from audio data characterizing the training query; and
      a corresponding ground-truth transcription of the training query;
   for each training query in the set of training queries:
      processing, using an encoder of a neural semantic parsing (NSP) model, the corresponding plurality of speech recognition hypotheses to generate a corresponding NSP embedding;
      processing, using a transcription decoder, the corresponding NSP embedding to generate a corresponding predicted transcription of the training query; and
      determining a corresponding first loss based on the corresponding predicted transcription of the training query and the corresponding ground-truth transcription of the training query; and
   training, based on the first losses determined for the set of training queries, the NSP model to learn how to predict user intents associated with the operations specified by the training queries.

13. The system of claim 12, wherein the corresponding plurality of speech recognition hypotheses comprises:
   a top speech recognition hypothesis associated with the speech recognition hypothesis having a highest respective speech recognition confidence score among the corresponding plurality of speech recognition hypotheses generated by the speech recognizer; and
   one or more alternative speech recognition hypotheses each having a respective speech recognition confidence score that is lower than the respective speech recognition confidence score of the top speech recognition hypothesis.

14. The system of claim 12, wherein:
each training query in the set of training queries further comprises a corresponding ground-truth user intent associated with the corresponding operation specified by the training query; and
the operations further comprise, for each training query in the set of training queries:
processing, using an NSP decoder of the NSP model, the corresponding NSP embedding to generate a corresponding predicted user intent for the training query; and
determining a corresponding second loss based on the corresponding predicted user intent and the corresponding ground-truth user intent associated with the corresponding operation specified by the training query; and
training the NSP model further comprises training the NSP model based on the second losses determined for the set of training queries.

15. The system of claim 14, wherein training the NSP model comprises:
weighting the first losses with a first weight; and
weighting the second losses with a second weight different from the first weight.

16. The system of claim 14, wherein training the NSP model comprises:
updating first coefficients of the encoder; and
updating second coefficients of the NSP decoder.

17. The system of claim 12, wherein the operations further comprise training the transcription decoder based on the first losses.

18. The system of claim 12, wherein the operations further comprise, for each training query in the set of training queries:
obtaining corresponding contextual information associated with the training query; and
generating the corresponding NSP embedding using the encoder by also processing, using the encoder, the corresponding contextual information associated with the training query.

19. The system of claim 18, wherein the corresponding contextual information comprises at least one of:
user device information for the training query;
location information associated with the training query;
time information associated with the training query;
user information associated with the training query; or
a previous query submitted during a dialog prior to the training query.

20. The system of claim 12, wherein the transcription decoder is not constrained to generate the corresponding predicted transcription for the training query as one of the corresponding plurality of speech recognition hypotheses.

21. The system of claim 12, wherein the transcription decoder is not executed during an inference operation of the NSP model.

22. The system of claim 12, wherein the operations further comprise, for at least one training query in the set of training queries, generating, using a teacher model, the corresponding ground-truth transcription from the audio data characterizing the training query.

* * * * *